Sept. 15, 1942.  W. ERNST  2,295,780
SELECTIVE DELIVERY REDUCTION MEANS FOR VARIABLE DELIVERY PUMPS
Filed May 10, 1940  2 Sheets-Sheet 1
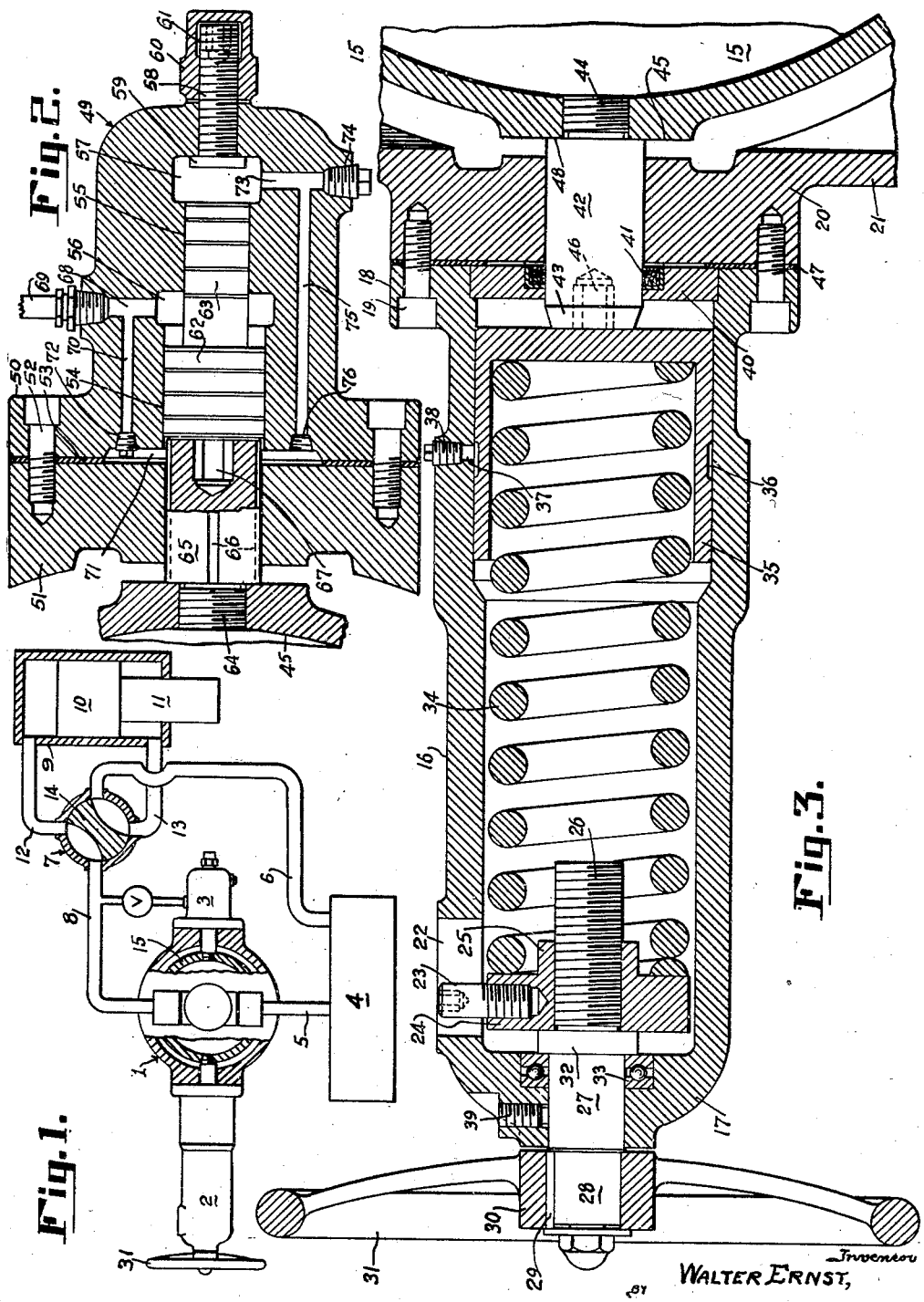
Inventor
WALTER ERNST,
by Toulmin & Toulmin
Attorneys Sept. 15, 1942.   W. ERNST   2,295,780
SELECTIVE DELIVERY REDUCTION MEANS FOR VARIABLE DELIVERY PUMPS
Filed May 10, 1940   2 Sheets-Sheet 2

Inventor
WALTER ERNST,
By
Toulmin & Toulmin
Attorneys

Patented Sept. 15, 1942

2,295,780

UNITED STATES PATENT OFFICE 2,295,780

SELECTIVE DELIVERY REDUCTION MEANS
FOR VARIABLE DELIVERY PUMPS

Walter Ernst, Mount Gilead, Ohio, assignor to
The Hydraulic Development Corp. Inc., Wilmington, Del., a corporation of Delaware Application May 10, 1940, Serial No. 334,406

12 Claims. (Cl. 103—38)

This invention relates to hydraulic machine circuits, and in particular, to means for regulating the speed of a hydraulic motor, such as a press ram, by altering the delivery of a variable delivery pump supplying pressure fluid to the circuit.

In my application Ser. No. 230,260, filed September 16, 1938, which has matured into Patent No. 2,258,981 there is disclosed and claimed an improved form of servomotor for controlling the output of a variable delivery hydraulic pump. In general, the shift or flow control ring of the pump is connected at one side of the ring to a spring-operated mechanism, which exerts a force on the shift ring in such a direction as continually to move the ring away from its neutral or no delivery position. The force of this spring is counteracted by a series of pistons operating through a rod connected to the side of the shift ring opposite the spring, these pistons tending to move the shift ring toward neutral with a force dependent on the pressure encountered by the ram or platen in the main hydraulic press. The greater the pressure which is built up at the back of the main ram, due to increased work resistance, the greater will be the force exercised by the pistons in overcoming the pull of the spring, and hence the shift ring will be returned more quickly to the neutral or no-delivery position. Thus the delivery from the hydraulic pump is varied directly in accordance with the work resistance encountered by the ram or platen.

It has been found that when a control mechanism of this character is employed, in which the spring element and the piston opposing it pull the pump shift ring on and off stroke, respectively, there is a tendency for the rods which connect the spring mechanism and the piston to the shift ring to become loose. It will be understood that these rods are normally threaded into opposite sides of the shift ring, and the force in moving the shift ring is communicated from the spring or piston solely through the threads on these rods. This loosening effect may be so pronounced that after many reciprocations of the shift ring the rods will become unthreaded from the ring to such an extent as materially to change the initial control adjustments which are usually made at the factory.

While a number of theories might be advanced as to the real cause of this loosening effect, I believe it may be due to the fact that the tension in the rod is in the same direction as the direction in which the rod would turn if it were loosened at the screw end. However, regardless of the proper explanation of this condition, I have found that the rods which are screwed into the shift ring and connected respectively with the spring mechanism and the piston on the opposite side of the ring, will remain in a tightly screwed condition if the tension applied to these rods is in a direction in which the rods would normally move when the screw threads are tightened. Thus, in accordance with the present invention, there is contemplated an improved structure in which both the spring and the piston push the pump shift ring on and off stroke rather than pull the shift ring.

The main object of the present invention is to provide an improved servomotor control for hydraulic pumps, and in which the shift ring is moved successively off and on neutral by a mechanism which has a relatively long operating life.

A more particular object is to provide a mechanism of this character in which the movement of the shift ring toward its on-stroke position and back to its neutral or no-delivery position is effected by means of a compressional rather than a tensional force, or in other words, in which the shift ring is pushed on and off stroke.

In a prior form of pump control mechanism in which a spring is employed to shift the ring to its on-stroke position, it has been customary to adjust the force exerted by the spring by means of two hand wheels connected to the spring mechanism. One of these hand wheels served to control the amount of compressional or tensional stress initially applied to the spring, thereby determining the speed with which the spring would move the shift ring in opposition to the piston and the other hand wheel would limit the outward movement of the spring, and thus determine the maximum stroke of the pump. Such a mechanism was somewhat complicated in that it required two hand wheels, the individual functions of which might be misunderstood by the operator.

In accordance with the present invention one of these hand wheels is eliminated, specifically that wheel which determines the maximum outward movement of the spring. The function of this wheel, namely to limit the maximum stroke of the pump, is taken over by a simpler structure by means of an adjusting screw with a locknut entering the control cylinder which contains the pistons, and providing a stop for the end of the piston which determines the maximum on-stroke position of the control. Thus another object or feature of applicant's invention is to eliminate the necessity of having two hand wheels for controlling the operation of the spring, and giving over the function of limiting the maximum stroke of the shift ring to a very simple mechanism which includes an adjusting screw positioned at the piston end of the control mechanism.

Other features and objects will be apparent as the specification is perused in connection with the accompanying drawings.

In the drawings:

Figure 1 is a diagrammatic view of a one-way variable delivery pump provided with the improved shift ring mechanism and working into a main press through a four-way valve.

Figure 2 is a fragmentary sectional view of the piston end of one form of control mechanism embodying the principles of the present invention.

Figure 3 is a fragmentary cross sectional view of the spring end of the control mechanism.

GENERAL CONSTRUCTION

Figure 4:
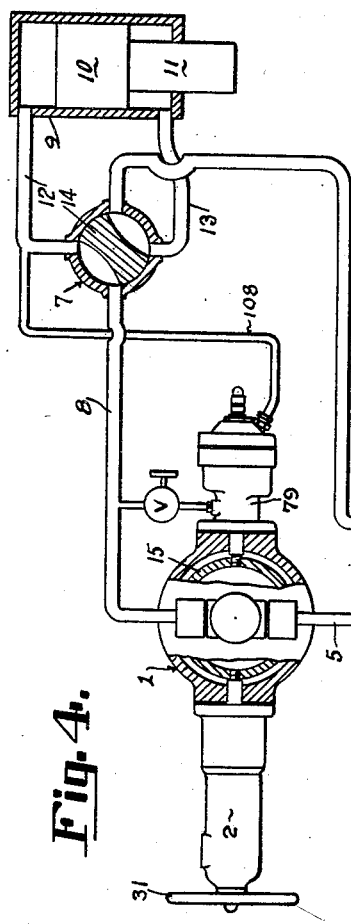
Figure 4 is a diagrammatic view, partly in section, of a modified form of control mechanism connected to a standard hydraulic pump for actuating a ram or platen through a four-way valve.

In general, the invention consists of a device for altering the delivery of a one-way variable delivery pump by shifting the control rod thereof when the press plunger of a press encounters work resistance greater than a predetermined back pressure. When the press plunger is subjected to this excessive pressure, pressure fluid is admitted to a piston mounted on the control rod of the variable delivery pump, and this piston shifts the control rod and the shift ring of the pump to reduce the delivery of the pump.

In many applications of hydraulic motors, particularly to hydraulic presses, it has been found desirable to move the press plunger or platen rapidly toward the work and then as the resistance at the work increases, due in most cases to a change in configuration of the work, the plunger is caused to move more slowly. For example, if it were desired to press out of sheet metal a structure which has a rectilinear cylindrical configuration and then depress it to a cone-like shape, it is apparent that the work resistance encountered by the press in shaping the cylindrical portion is much less than the resistance offered by the conical portion. Consequently, it is desirable that the downwardly moving plunger shall have one speed for pressing out or forming the cylindrical portion and another speed, perhaps considerably slower, for forming the conical portion. It is further apparent that the plunger can move at considerable speed until the platen actually contacts the workpiece. The present invention, therefore, contemplates the employment of an improved control mechanism by which the speed of the plunger is regulated strictly in accordance with the work resistance encountered by the platen, so that as this resistance is increased the speed of the plunger is decreased in a corresponding degree.

In general, a typical circuit for accomplishing the objects of this invention is shown in Figure 1, and consists of a variable delivery pump 1 having a spring-urged mechanism 2 for urging the flow-control element of the pump in one direction, and a piston-urged mechanism 3 for moving the flow-control element in the opposite direction. A tank 4 supplies fluid for the operation of the circuit, and from the tank a suction line 5 is taken to the inlet of the pump 1. There is a return pipe 6 leading into the tank from a four-way valve, designated generally at 7. From the pressure or discharge outlet of the pump 1 there is taken a pipe 8 which leads to the valve 7. The main press cylinder is indicated at 9 and contains the usual form of piston 10 together with a ram or plunger 11. A pipe 12 is connected between the upper side of the cylinder 9 and the valve 7, and likewise a pipe 13 is connected between the under side of the piston 10 and the valve. The valve 7 comprises a cylindrical casing which receives the pipes 6, 8, 12 and 13, preferably at equi-distant positions. Within the casing there is a drum 14 having arcuate sides, and adapted to rotate in such a way that in one of its positions the pipe 8 is in communication with the pipe 12 and the pipe 13 is in communication with the pipe 6.

The flow-control element or shift ring is designated 15, and as is well understood in the art, is supported between a pair of horizontally positioned pads in order to be moved in a horizontal direction from one side of the pump to the other. When moved in this manner, i. e. away from its neutral position by means of the spring-urged mechanism, the eccentricity of the radially operated pistons contained within the pump is increased, causing these pistons to deliver pressure fluid through the pipe 8 and into the top of the cylinder 9 at a pressure depending on the amount of eccentricity and therefore on the amount of travel of the shift ring 15 from neutral.

Assuming that the plunger 11 carries a die or other metal-forming element, and that a sheet of metal is placed on the bed of the press over the other die half, it is apparent that as the piston 10 travels downwardly the plunger 11 will eventually contact the workpiece. As the piston continues to move to form the article determined by the shape of the dies, the resistance to further movement of the piston will become either greater or less, depending on the shape to which the article is made to conform. This resistance is usually of a character as greatly to increase so that back pressure is developed in the upper part of the cylinder. Unless this back pressure were relieved in some way, assuming that the pump 1 is being operated at a constant speed, for example by means of an electric motor, the plunger or its die might readily tear through the workpiece and thus spoil the article, even causing damage to the press.

When the resistance developed by the work becomes so great as to require a reduced speed of the descending ram or plunger, it is desirable automatically to cut down the volumetric output of the pump. In accordance with the disclosure of my prior application, identified hereinbefore, there is provided a piston mechanism which is responsive to the excess pressure developed at the upper part of the cylinder 9 due to increased work resistance, and the function of this mechanism is to return the shift ring 15 in a direction toward neutral, depending on the amount of the excess pressure. Thus the spring mechanism continually urges the flow-control element 15 to the right to put the pump on stroke at its maximum volumetric output and pressure, whereas the piston mechanism 3 serves to offset the effect of the spring and to return the flow-control element back to neutral if necessary, in the event that an extremely excessive pressure is encountered by the piston 10 in the main press.

It will be understood that when the article has been formed the member 14 in the valve 7 is rotated clockwise approximately ninety degrees, causing pressure fluid to flow from the pipe 8, into the pipe 13, thereby applying pressure to the under side of the piston 10 and causing the plunger 11 to be retracted. It might happen that as the die secured to the plunger 11 is being stripped from the formed article, an excessive pressure will be encountered at the lower end of the cylinder 9 due to the stress involved by the stripping operation. It is therefore desirable that the output of the pump 1 shall be reduced at this time until the excess pressure is relieved, which will take place when the die or plunger has actually broken contact with the workpiece. This automatic control of the pressure in the upper or lower parts of the cylinder 9 is effected by mechanism which will be described in detail hereinafter.

Figure 3 shows the details of the structure forming the spring-urged mechanism 2 of Figure 1. This mechanism includes a hollow cylindrical casing 16, having a cap portion 17 at one end and a flange portion 18 at the other end which is adapted to be screwed, as indicated at 19, to the side elements 20 of the pump casing 21. This casing contains the flow-control member or shift ring 15, the purpose of which is to vary the eccentricity of the radially operating pistons of the pump. In order to control the volumetric output of the pump at the end of the cylinder 16 nearer the cap 17, there is an elongated slot 22 which is adapted to receive the upper end of a headless screw 23 threaded into the side of the washer 24. This washer is provided with a hub 25, and is threaded to receive the threaded end 26 of a horizontally disposed rod 27 which extends through a centrally positioned opening in the cap 17. The rod 27 terminates in a smaller diameter portion 28, which is keyed as at 29 to the hub 30 of a hand wheel 31. Between the shank portion 27 and the screw portion 26 there is a portion 32 of larger diameter, which serves as a spacing member between the washer 24 and the interior surface of the cap 17. This cap member is provided with an annular groove for receiving a ball bearing mechanism 33 in order to reduce the frictional effects between the rod 27 and the cap 17.

There is a large helical spring 34 contained within the chamber of the cylinder 16, this spring bearing against the inner surface of the washer 24 at one end and at the other end is contained within a cup member or sleeve 35, which is adapted to move longitudinally within the interior of the cylinder 16. The interior of the cylinder 16 over which the sleeve 35 moves is preferably ground, as is also the outside diameter of the said member, in order to assure a slidable but yet tight fit. It will be noted that the right-hand end of the spring 34 bears against the inner surface of the flat portion of the member 15 and is therefore continually urging the cup-shaped member to move in the right-hand direction. The ground bearing surface between the member 35 and the interior of the cylinder 16 is preferably lubricated by means of an annular slot 36, into which a lubricant is dropped through an opening 37 in the cylindrical casing 16. A plug 38 may be provided for this opening. A screw 39 is provided in the cap portion 17 of the cylinder in order to bear slightly against the rod or shaft 27, thereby producing a slight friction at this point and thus preventing any undesired movement of the shaft. The right-hand end of the cylinder 16 is closed by a washer 40 which is held in place preferably by an annular groove formed in the interior of the cylinder 16. There is an oil seal 41 provided in this washer.

The washer 40 and the side element 20 of the pump are bored out to receive a round shaft or control rod 42 which is tapered at one end, as indicated at 43, and at the other end carries a threaded portion 44. The tapered end bears against the exterior flat surface of the cup-shaped member 35, and the opposite end 44 is threaded into a portion 45 which extends outwardly from the control or shift ring 15. The control rod 42 is provided with a countersunk opening 46 of hexagonal configuration, which receives a socket wrench in order to screw the rod into the shift ring. It will be noted that the oil seal member 41 bears against the control rod 42, thereby preventing oil or any other pressure fluid from leaking along the surface of the control rod. Leakage of fluid is also prevented between the flange portion 18 and the left-hand side of the element 20 by means of a metal gasket 47.

From the foregoing it is evident that by turning the hand wheel 31 to the right, and assuming that the threads on the portion 26 are right-handed, the washer 24 will be caused to move to the right and to change the compression on the spring member 34. This increase in compression will cause the member 35 to tend to move to the right, which in turn will slide the control rod 42 along its bearing to move the shift ring 15 to the right. It will be understood that the spring 34 is always maintained under compression, so that in the absence of an opposing force the spring will cause the shift ring 15 to move to the right, which is the on-stroke position. By rotating the wheel 31 the amount of compression in the spring is either increased or decreased, depending on the direction in which the wheel is turning, and therefore the normal movement of the shift ring 15 to the right is increased or decreased in corresponding degree.

As shown in the drawings, the control rod 42 is provided with a shoulder 48, and it is preferred to have this shoulder abut the flat portion of the extension 45 of the shift ring, this position being obtained by screwing the control rod into the shift ring as far as possible. It will be additionally noted that since the control rod 42 is always urged in the right-hand direction by the spring 34, the threads of the portion 44 are always in compression. Inasmuch as the shoulder 48 bears against the flat surface 45 the threads are relieved of a part of this compressional stress.

As stated hereinbefore, when the work resistance manifested in the press cylinder either during the forward or reverse movement of the main piston exceeds a predetermined pressure, it is desirable to reduce the volumetric output of the pump 1 and therefore reduce the pressure in the pipe 8 (Figure 1) in an amount determined by the excess of pressure. It will be understood in this connection that the spring 34 always tends to maintain the shift ring 15 on stroke, and it is therefore necessary to provide an opposing force to move the shift ring toward neutral when necessary. This opposing force is derived from a multi-piston arrangement, one form of which is shown in Figure 2. The pistons are contained in a heavy casting 49, flanged at one end as indicated at 50, which end is secured to the side element 51 of the pump casing by means of screws 52. There is provided a gasket 53 between the flange 50 and the element 51.

The casting 49 is provided with a pair of concentric bores 54, 55 which open from the side of the casting nearer the element 51. The bore 54 is considerably larger than the bore 55 and terminates in an annular chamber 56. The bore 55 communicates with this chamber at one end, and at the other end terminates in an annular chamber 57. The casting 49 is closed at the end opposite the element 51 except for a threaded opening which receives a screw 58, the latter extending to the right for a considerable distance beyond the casting. The inner end of the screw is provided with a contact piece 59 which is positioned in the chamber 57. There is a locknut 60, of any suitable and well known type, threaded onto the screw 58, this nut being preferably in the form of a cap provided with a chamber 61 somewhat larger than the screw and extending for a short distance beyond the outer end of the screw, as is indicated in Figure 2. The bores 54, 55 contain plungers 62, 63, respectively, these plungers being provided with four or more piston rings, as indicated. The inner end of the plunger 63 abuts the outer end of the plunger 62, and the outer end of the plunger 63 terminates at a position in line with the inner side of the annular chamber 57.

The right-hand side of the shift ring 15, as seen in Figure 2, is provided with a threaded opening which receives a screw end 64 of a control rod 65, which is provided with four or more peripheral grooves 66 extending longitudinally of the rod. The purpose of these grooves will be pointed out hereinafter. The rod extends as far as the inner end of the plunger 62, which it normally abuts. A countersunk hexagonal opening 67 is provided in the control rod 65 and extends from the outer end of the control rod inwardly toward the shift ring. The opening 67 is adapted to receive the hexagonal end of a wrench in order to screw the control rod into the shift ring.

There is an opening 68 extending radially from the chamber 56 through the casting 49, this opening being threaded at its outer end to receive a screw pipe 69. There is a longitudinal opening 70 leading from the opening 68 and communicating with a shallow chamber 71 formed at the inner end of the casting 49. The inner end of the opening 70 is adapted to receive a screw plug 72. There is an opening 73 extending radially from the chamber 57, the outer end of this opening being adapted to receive a screw plug 74. A longitudinal opening 75 leads from the radial opening 73 and communicates with the shallow chamber 71. The inner end of the opening 75 is threaded as indicated at 76, and is adapted to receive a screw plug (not shown).

*Operation of structure shown in Figures 1, 2 and 3*

Let us now assume that for a given piece of work it is desirable to limit the back pressure on the piston 10 to an amount not exceeding 1500 pounds. This pressure is determined by the character of the press, the nature of the work and particularly the configuration to which the work is formed within the press. As was pointed out hereinbefore, the spring 34 normally urges the shift ring 15 off neutral so that the platen begins to descend. However, as the platen contacts the work a back pressure will be built up at the rear of the piston 10, depending on the amount of resistance exerted by the work.

Assuming that it is desired to stop the press by returning the shift ring to neutral when a back pressure above 1500 pounds per square inch is encountered, a pipe connection is made between the opening 68 and the cylinder 9 at the rear of the piston 10. The screw plug 72 is inserted in the opening 70 and a screw plug 74 in the opening 73. The opening 75 remains in communication with the shallow chamber 71. As the spring 34 moves the shift ring to the right (as seen in Figure 3), the plungers 62 and 63 are also forced to move to the right by the control rod 65 which is secured to the shift ring at a position opposite the control rod 42. The right-hand movement of the plunger 63 causes the residual fluid which has collected in the chamber 57 to flow through the openings 73 and 75, into the shallow chamber 71, and through the grooves 66 into the casing of the pump. As the pressure builds up in the main cylinder to the rear of the piston, pressure fluid is conducted to the opening 68, and when this pressure exceeds 1500 pounds per square inch it will cause the plunger 62 to move to the left, in turn causing the flow control member 15 to shift toward neutral.

It will be understod that the annular area at the right-hand side of the plunger 62 has been previously calculated to cause the plunger to oppose the spring 34 when the pressure in the chamber 56 exceeds 1500 pounds per square inch. It will be noted that a small amount of pressure fluid might leak past the rings on the plungers 62, 63 and this fluid is vented to the casing on the one hand through the grooves 66 or through the chamber 57, and thence through the openings 73, 75 and the grooves 66.

In case it is desired that the press build up a higher back pressure, for example 2500 pounds per square inch, the openings 68 and 75 are plugged, but the opening 70 is permitted to communicate with the chamber 71, and the pipe from the cylinder 9 to the rear of the piston 10 is now taken to the opening 73. When the shift ring has been moved to its on-stroke position by the spring 34, as before, as soon as the back pressure in the cylinder 9 exceeds 2500 pounds per square inch, the pressure fluid admitted to the chamber 57 through the opening 73 has acquired sufficient pressure to move the plunger 63 to the left, causing a corresponding movement of the shift ring in opposition to the spring 34. Thus the flow control member is shifted to its neutral position and the delivery of the pump is stopped. It will be understood that the effective area of the plunger 63 has been so calculated that a pressure of 2500 pounds per square inch will be sufficient to move the shift ring 15 back to neutral. Any pressure fluid leaking from the chamber 57 past the rings on the plunger 55 will be vented to the pump casing through the chamber 56, the openings 68, 70, into the shallow chamber 71 and thence through the grooves 66.

It will be understood that while I have described the operation of the improved piston control means, using for example, pressures of 1500 and 2500 pounds per square inch, that the effective areas of the plungers 62, 63 may be calculated to accommodate any other series of pressures. Indeed, the openings 68 and 73 may be placed in communication with one another so as to provide an operation of the piston mechanism which is different from either the 1500-pound or the 2500-pound assumed pressures. Any number of pistons and corresponding number of back pressures may be accommodated by the improved mechanism for causing the shift ring to move to neutral when pressures above any or all of the predetermined amounts have been encountered in the main cylinder 9. It might be feasible to make an instantaneous change-over in the application of the pressure fluid from the opening 68 to the opening 73, or vice versa, and this may be most conveniently done by the use of a four-way valve. It is also apparent that if desired either or both of the openings 68, 73 may be placed in communication through suitable pipes with the working side of the pull-back cylinders, or one opening may be applied to the rear side of the main cylinder and the other opening to the working or forward side of a pull-back cylinder. It will be noted that when the fluid pressure is applied either to the plunger 62 or the plunger 63, or both, the effect of this pressure is to move the control rod 65 to the left in opposition to the spring 34. Under these circumstances, this movement of the control rod is communicated to the shift ring through the threads on the threaded end portion 64. These threads are therefore maintained in compression during this shifting movement, the same as in the case when the shift ring is moved to the right by the spring 34.

I have found that when the threads on the control rods 65 and 42 are maintained in compression rather than tension during the shifting of the flow-control element on and off neutral, the threaded end portions of the control rods remain fast and secure to the flow-control element. The reason for the maintenance of this rigid joint between the control rod and the shift ring might reside in the fact that the pressure exerted on the control rod is in the same direction as the direction which the rod would have if the threads were rotated to thread the rod pipe into the ring. However, regardless of the true explanation, it is a fact based on considerable experience that when the spring 34 and the plungers 62, 63 opposing the action of the spring push the pump shift ring on and off stroke rather than pull the shift ring during these movements, the threads on the ends of the control rods are no longer stripped from the tapped connections in the shift ring but instead these threads remain intact, firmly and permanently securing the respective control rods to the shift ring during a long operating life.

It has been further found that the pushing effects exerted on the shift ring by the control rods 42 and 65, which are in turn actuated by the spring 34 and the plungers 62, 63, respectively, do not detract in the slightest from the smoothness of operation of the shift ring nor from its regularity of travel, dependent on the adjustments produced at the hand wheel 35 and the fluid pressures applied to the plungers 62, 63. In order to prevent slamming of the control in case of sudden or accidental fluctuation of pressure, a choke check 77 may be interposed in the control line leading from the pump line 8 to the control cylinder 3 (Figure 1).

The action of the pump pressure working against any of the piston areas on the plungers 62, 63 and through the pump shift ring against the spring 34 determines the maximum pressure output of the pump. A limiting of the maximum stroke of the shift ring 15 caused by the control spring 34 will determine the maximum stroke of the pump, and consequently its volumetric output. In the case of the prior-art form of control, this was done by a second hand wheel which limited the outward movement of the spring. However, in the new form of control as disclosed in this application, the maximum stroke of the pump is achieved in a much more simple manner by means of the adjusting screw 58 entering the control cylinder at the right-hand end, and providing a stop for the end of the plunger 63 which determines the maximum on-stroke position of the control.

It is apparent that as the screw 58 is turned clockwise, i. e. inwardly by means of a hexagonal wrench inserted in the opening 78, the contact piece 59 moves nearer the right-hand end of the plunger 63. Consequently as pressure is put on the spring 34 by the hand wheel 31, which tends to shift the flow-control element 15 to the right, the limit of travel of the shift ring in this direction is determined by the position of the contact piece 59. The maximum stroke of the pump is usually determined at the factory according to specifications, and when once set there is little or no occasion to change the same so that the locknut 60 can be screwed into position over the end of the adjusting screw, thereby assuring no tampering or unauthorized change in position of the screw 58.

The modification of the control piston structure shown in Figures 4 and 5 operates somewhat similarly to that explained in connection with Figures 1 and 2, except that an additional piston or cylinder is provided. Similar reference characters have been employed in connection with Figures 4 and 5 to designate the corresponding elements in Figures 1 and 2.

The heavy casting 79 is secured at the left-hand end, as before, to the side element 51 through the gasket 53, but the opposite end terminates in a portion of considerable size. This portion is provided with a bore 80 which receives a cylinder or piston 81, provided with a plurality of piston rings 82. The piston 81 has an opening 83 therein, closed at the bottom and leading from the right-hand side of the piston. There is a hub 84 extending from the left-hand side of the piston and adapted slidably to move within a longitudinal bore provided in the casting 79. The casting 79 has a shoulder 85 which projects toward the piston 81 and forms a seat for the latter as the piston reaches its innermost position.

Facing the right-hand end of the casting 79 there is a heavy cap-like member 86, the face surface 87 of which bears against the face surface 88 of the casting 79. These face surfaces are provided with shoulders indicated at 89 and 90, respectively, which are so spaced apart as to leave an annular opening which receives three or more washers 91 of packing material. The cap member 86 is secured to the casting 79 by means of a plurality of screws 92. This cap member is provided with a stepped bore, one portion of which bears against an extension 93 of the piston member 81, and another portion is threaded as at 94 to receive the threaded head of a gland 95. The latter is bored out and surrounds the piston extension 93. There is an annular space left between the innermost bore of the cap member 86 and the inner surface of the gland 95, this space being filled with packing material indicated at 96. The extension 93 extends through the bores of the cap member 86 and the gland 95, and terminates just beyond the outer surface of the gland member.

The extension 93 is bored out and is threaded, as indicated at 97, to receive the screw portion 98 of a control rod 99 which extends through the piston 81 and its hub 84, terminating just beyond the left-hand surface of the hub. This rod may be provided with piston rings, as indicated at 100. The threaded portion 98 of the control rod extends considerably beyond the gland 95 and is provided with a locknut 101 and an internally threaded cap 102 which fits over the right-hand end of the rod. As in the case of the screw 58 shown in Figure 2, the control rod 99 is provided with a hexagonal opening 103 at its right-hand end in order to rotate the rod with respect to the extension 93. Thus the rod can be moved right or left with respect to the piston 81, causing the left-hand end of the rod to project either further outwardly or inwardly with respect to the hub 84. The cap member 86 is provided with an axially extending pin 104 which is adapted to be received by the opening 83 in the piston 81.

There is a diagonal opening 105 extending through the piston 81 and leading from the space about the shoulder 85 to the annular space 106 between the control rod 99 and the piston 81 and its extension 93. There is also a diagonal opening 107 leading from the exterior of the cap member 86 to the space between the right-hand face of the piston 81 and the left-hand face of the cap member 86. The outer end of the opening 107 is enlarged and threaded to receive a pipe coupling 108 (Figure 4), which leads from the pipe 12 connected to the rear of the piston 10 in the cylinder 9. The casting 79 is provided with longitudinal openings 70, 75 and radial openings 68, 73 similar to those shown and described in connection with Figure 2.

Figure 5:
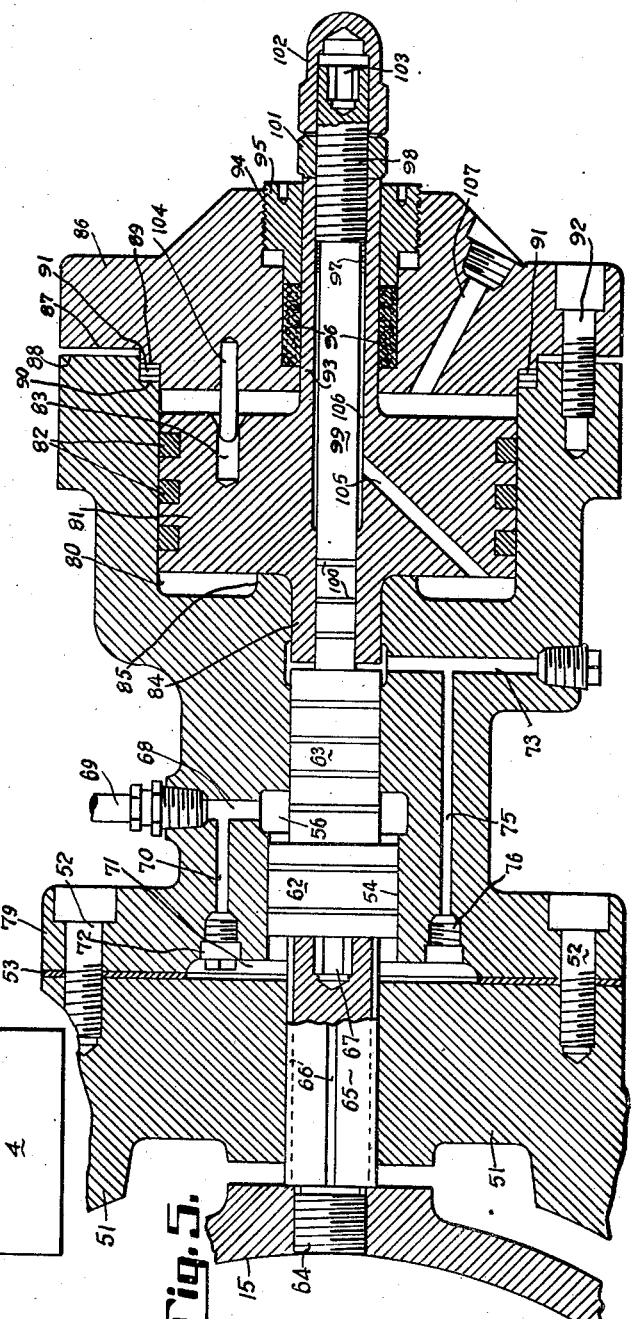
Figure 5 is a fragmentary cross sectional view of a second form of the piston end of the improved control mechanism. The hydraulic connections and the piston mechanism shown in Figure 5 are illustrated in Figure 4, and similarly the hydraulic connections to the pistons shown in Figure 2 are illustrated in Figure 1.

*Operation of the structure shown in Figures 4 and 5*

As in the case of Figures 1, 2 and 3, let us assume that the spring 34 has moved the control rod 42 and the shift ring 15 to the right, thus causing the pump to go on stroke. While the ram or plunger 11 of the main cylinder 9 encounters little or no resistance from the work, the back pressure built up to the rear of the piston 10 is negligible. However, when work resistance is encountered, and assuming that the back pressure builds up to an amount greater than a predetermined value, for example 1500 pounds per square inch, the pump will force pressure fluid through the pipe 8 into the four-way valve 7, and thence through the pipes 108, through the opening 107, into the space between the right-hand side of the piston 81 and the left face of the cap member 86.

Now let us assume that the control rod 99 has the adjustment shown in Figure 5 so that its left-hand end projects just beyond the hub 84. The pressure fluid at the right of the piston 81 will tend to move the piston to the left, assuming that the left-hand side of the piston does not abut the shoulder 85. It was pointed out that the spring 34 had already moved the shift ring 15 to the right, and accordingly has also moved the plungers 62 and 63 to the right. Consequently, as the piston 81 moves to the left the control rod 99 will contact the right-hand face of the plunger 63, causing this plunger and the abutting plunger 62 to move to the left in a direction as to oppose the spring 34. Consequently the shift ring 15 is moved toward neutral, and if the back pressure in the cylinder 9 is considerably above the predetermined value, the piston 81 will move the shift ring to its neutral or no-delivery position. It is apparent that in view of the large area presented by the piston 81 to the pressure fluid contained between the piston and the cap member 86 that the piston is caused to move very quickly. It will be further noted that the forces exerted by the spring 34 and by the piston 81 are such as to place the control rods 42 and 65 under compression, and in both cases cause a pushing effect on the shift ring. Thus the threaded ends of the rods 42 and 65 always remain in a tightened condition, as was explained in connection with Figures 1, 2 and 3.

During the left-hand movement of the piston 81 any oil that would normally be trapped between the left-hand side of the piston and the casting 79 is permitted to flow through the opening 105 into the annular space 106, thus preventing any pressure from developing to the rear of the piston 81. It is apparent that the control rod 99 can be adjusted in the longitudinal direction by simply removing the cap 102 and inserting a wrench in the opening 103, after the locknut 101 has been loosened. The rod 104 prevents any turning of the piston 81 relative to the casting 79 during this operation. As the control rod 99 is caused to recede into the hub 84 the farther will the piston 81 have to move before contact is established with the right-hand side of the plunger 63. Consequently considerable adjustment may be effected as between the fluid pressure which is necessary to move the shift ring 15 toward neutral and the actual amount of movement which is given to the shift ring in this direction. It is also evident that the position of the control rod 99 with respect to the piston 81 determines the maximum stroke of the shift ring caused by the control spring 34 and consequently the maximum volumetric output of the pump, thus performing the same function as the adjusting screw 58 in Figure 2. However, the control rod 99 has the additional function of determining as to how far the piston 81 shall move before contact is established with the plunger 63, and thus to return the shift ring 15 toward neutral or no-delivery position. It may be desirable to cause the shift ring 15 to move very quickly toward neutral for a predetermined distance in order rapidly to reduce the output of the pump, and then to move the shift ring still farther toward neutral at a much slower pace. This can be effected by the use of the threaded pipe 69, which is also in communication with the back pressure in the cylinder 9.

Assuming that the screw plugs 72 and 74 are in position and that the opening 75 is left unplugged; and let us further assume that the control rod 99 has been moved to the right with respect to the piston 81 so as to leave no portion which projects beyond the hub 84. Under these conditions the left-hand end of the hub 84 will have contacted the plunger 63, and during the left-hand movement of the piston 81 will have moved the shift ring 15 part way back to neutral. However, before returning the shift ring entirely to neutral the left-hand face of the piston 81 will have contacted with the shoulder 85, and can therefore move no farther to the left. However, pressure fluid has been simultaneously admitted to the opening 68 through the pipe 69, and operates on the effective area of the plunger 62, causing the cylinder to move farther to the left but more slowly than was the case with the piston 81, due to the difference in the effective areas, so that the shift ring may now be moved entirely to neutral. Thus the combination of the large area piston 81 and the smaller area plunger 62 will cause the shift ring to be moved very quickly at the start toward neutral, and therefore this movement will slow down until the shift ring actually reaches neutral. It is apparent that any adjustment may be obtained between these various velocities, as is desired, depending on the type of work presented to the press, the adjustments being brought about by variations in the effective areas presented by the piston 81 and plunger 62; also the adjustment of the control rod 99 within the piston 81.

As in the case of Figure 2 described hereinbefore, pressure fluid which leaks past the piston rings on the cylinder 63 is vented through the openings 73, 75 and through the grooves 66 into the pump casing. In case it is desired that the shift ring 15 shall be moved toward neutral when the back pressure on the piston 10 is, for example, 2500 pounds per square inch, connection is made between the pipe 69 and the opening 73. In this case the opening 75 is plugged, but the opening 70 is left unplugged. The pressure fluid will pass up through the opening 107, as before, causing the piston 81 to move to the left, and either moving the shift ring 15 all the way to neutral, as explained above, or moving the ring only partly to neutral and leaving the additional movement to be more slowly effected by the pressure fluid passing through the opening 73 and acting on the right-hand side of the plunger 63. The pressure fluid which gets past the piston rings on the plunger 63 is vented to the pump casing through the openings 68, 70 and the grooves 66.

While I have described the operation of the piston 81 and the plunger 62 or 63 as being made effective by the same back pressure, it is apparent that due to the considerable difference in the effective areas of the piston 81 and the plunger 62 or 63, considerably less pressure may be necessary to operate the piston 81 than will operate the plunger 62 or 63. Consequently, it is within the contemplation of my invention to adjust the apparatus such that the piston 81 will respond to a lower back pressure, if desired, than the plunger 62 or 63 so that when a fairly low back pressure is developed in the main cylinder the piston 81 will immediately reduce the output of the pump by moving the shift ring to the left but will not entirely cut off the output, leaving the last-mentioned function to either the plunger 62 or 63, depending on the type of connection and depending on whether the back pressure exceeds the pressures for which the plungers 62 and 63 have been adjusted. It is also evident that, if desired, the position of the control rod 99 within the piston 81, and the position of the shoulder 85 may be so determined as to render the piston 81 entirely inoperative insofar as moving the shift ring 15 any distance whatever to the left is concerned. In this case all of the control is vested in the plunger 62 or 63, depending on which of the openings 68, 73 is being momentarily employed.

From the foregoing it is evident that the adjustments which may be obtained in the two-piston structure shown in Figure 2, or the three-piston structure shown in Figure 5, are almost limitless, so that any control of the shift ring in opposing the spring 34 may be obtained, depending on the back pressures momentarily encountered in the cylinder 9. The movement of the shift ring can be controlled not only as to instantaneous positions, depending on the back pressure, but also the speed with which it attains these various positions so that articles of complicated form and entailing considerable variations in back pressure may be readily fabricated in a press provided with the improved piston control chamber. The manner in which the elements 58 and 99 serve to control or limit the maximum stroke of the shift ring caused by the control spring 34 is very simple since it merely entails the rotational adjustment of these elements.

It will be understood that I desire to comprehend within my invention such modifications as come within the scope of the claims and the invention.

Having thus fully described my invention, what I claim as new and desire to secure by Letters Patent, is:

1. In combination, a variable delivery pump for supplying pressure fluid to a fluid-actuated machine which develops different back pressures throughout an operating cycle, a shiftable element in said pump including at least one back-pressure-responsive piston for controlling the amount of fluid delivered by the pump, means positioned at one side of the pump and tending continually to shift said element away from the no-delivery position, means positioned at the opposite side of the pump for moving the shiftable element in the opposite direction in accordance with the back pressure developed in said machine, and means positioned at said opposite side of the pump and including an adjustable screw in line with said piston for controlling the maximum stroke of the shiftable element.

2. In combination, a variable delivery pump for supplying pressure fluid to a fluid-actuated machine which develops different back pressures throughout an operating cycle, a shiftable element in said pump including at least one back-pressure-responsive piston for controlling the amount of fluid delivered by the pump, means positioned at one side of the pump and tending continually to shift said element away from the no-delivery position, means positioned at the opposite side of the pump for moving the shiftable element in the opposite direction in accordance with the back pressure developed in said machine, and means including an axially adjustable rod positioned at said opposite side of the pump and substantially in line with said piston for controlling the maximum stroke of the shiftable element.

3. In combination, a variable delivery pump for supplying pressure fluid to a fluid-actuated machine which develops different back pressures throughout an operating cycle, a shiftable element in said pump for controlling the amount of fluid delivered by the pump, means positioned at one side of the pump and tending continually to shift said element away from the no-delivery position, means including a piston positioned at the opposite side of the pump for moving the shiftable element in the opposite direction in accordance with the back pressure developed in said machine, and means including a rod which is axially adjustable and adapted to contact with said piston for controlling the maximum stroke of the shiftable element.

4. In combination, a variable delivery pump for supplying pressure fluid to a fluid-actuated machine which develops different back pressures throughout an operating cycle, a shiftable element in said pump for controlling the amount of fluid delivered by the pump, means positioned at one side of the pump and tending continually to shift said element away from the no-delivery position, means positioned at the opposite side of the pump for moving the shiftable element in the opposite direction in accordance with the back pressure developed in said machine, and means positioned at said opposite side of the pump for controlling the maximum stroke of the shiftable element, said last-mentioned means comprising a rod threaded into the pump casing, the effective length of said rod being adapted to be changed by rotating the rod on the threads, thereby controlling the amount of movement permitted the shiftable element.

5. In combination, a variable delivery pump for supplying pressure fluid to a fluid-actuated machine which develops different back pressures throughout an operating cycle, a shiftable element in said pump for controlling the amount of fluid delivered by the pump, means positioned at one side of the pump and tending continually to shift said element away from the no-delivery position, means positioned at the opposite side of the pump for moving the shiftable element in the opposite direction in accordance with the back pressure developed in said machine, and means positioned at said opposite side of the pump for controlling the maximum stroke of the shiftable element, said last-mentioned means comprising a rod threaded into the pump casing, the effective length of said rod being adapted to be changed by rotating the rod on the threads, thereby controlling the amount of movement permitted the shiftable element, said rod extending to the exterior of said pump casing and adapted to be rotated by means applied external of the casing.

6. In combination, a variable delivery pump for supplying pressure fluid to a fluid-actuated machine which requires fluid at different pressures throughout an operating cycle, a shiftable element in said pump for controlling the amount of fluid delivered by the pump, a casing on one side of said shiftable element containing a spring for urging the shiftable element to its on-stroke position, a casing on the opposite side of said shiftable element and containing a plurality of pistons for urging the shiftable element toward its off-stroke position, said pistons being actuated by the fluid back pressure developed in said machine, and compression rods between said spring and the shiftable element, also between at least one of said pistons and the shiftable element, the casing containing the pistons being provided with a plurality of openings which may be selectively plugged to admit back pressure fluid to either of said pistons.

7. In combination, a variable delivery pump for supplying pressure fluid to a fluid-actuated machine which requires fluid at different pressures throughout an operating cycle, a shiftable element in said pump for controlling the amount of fluid delivered by the pump, a casing on one side of said shiftable element containing a spring for urging the shiftable element to its on-stroke position, a casing on the opposite side of said shiftable element and containing a plurality of pistons for urging the shiftable element toward its off-stroke position, said pistons being actuated by the fluid back pressure developed in said machine, and compression rods between said spring and the shiftable element, also between at least one of said pistons and the shiftable element, the casing containing the pistons being provided with a plurality of opening which may be selectively plugged to admit back pressure fluid to either of said pistons, the remaining openings which are unplugged serving as a vent for the trapped fluid to the pump casing.

8. In combination, a variable delivery pump for supplying pressure fluid to a fluid-actuated machine which requires fluid at different pressures throughout an operating cycle, a shiftable element in said pump for controlling the amount of fluid delivered by the pump, means positioned at one side of said shiftable element for continually urging the element away from the no-delivery position, and means positioned at the opposite side of said element for urging the element toward the no-delivery position, said last-mentioned means including a piston which is responsive to the back pressure fluid from said machine and a rod positioned between said piston and said shiftable element, said rod being provided with grooves through which pressure fluid can be vented to the casing of the pump.

9. In combination, a variable delivery pump including a casing therefor for supplying pressure fluid to a fluid-actuated machine which develops different back pressures throughout an operating cycle, a shiftable element in said pump for controlling the amount of fluid delivered by the pump, means positioned at one side of the pump and tending continually to shift said element away from the no-delivery position, means positioned at the opposite side of the pump for moving the shiftable element in the opposite direction in accordance with the back pressure developed in said machine, said means comprising a pair of pistons contained within the casing and arranged end to end, a rod abutting the inner surface of the inner piston and secured to said shiftable element, said inner piston being of larger diameter than the outer piston whereby an annular pressure area is presented between the adjacent piston surfaces, a pair of radial passageways extending through the casing and communicating respectively with said annular piston area and the effective area of the outer piston, and passageways running parallel of the casing and extending between the interior of the casing and the respective radial passageways, all of said passageways adapted to be selectively closed and opened in order to permit fluid back pressure of different amounts to be applied respectively to the effective areas of the pistons.

10. In combination, a variable delivery pump including a casing therefor for supplying pressure fluid to a fluid-actuated machine which develops different back pressures throughout an operating cycle, a shiftable element in said pump for controlling the amount of fluid delivered by the pump, means positioned at one side of the pump and tending continually to shift said element away from the no-delivery position, means positioned at the opposite side of the pump for moving the shiftable element in the opposite direction in accordance with the back pressure developed in said machine, said means comprising a pair of pistons contained within the casing and arranged end to end, a rod abutting the inner surface of the inner piston and secured to said shiftable element, said inner piston being of larger diameter than the outer piston whereby an annular pressure area is presented between the adjacent piston surfaces, a pair of radial passageways extending through the casing and communicating respectively with said annular piston area and the effective area of the outer piston, and passageways running parallel of the casing and extending between the interior of the casing and the respective radial passageways, all of said passageways being adapted to be selectively closed and opened in order to permit fluid back pressure of different amounts to be applied respectively to the effective areas of the pistons, the lateral passageway leading to the area of the smaller piston and the radial passageway leading to the effective area of the larger piston being all adapted to be simultaneously closed when fluid back pressure is applied to the radial passageway leading to the area of the smaller piston.

11. In combination, a variable delivery pump including a casing therefor for supplying pressure fluid to a fluid-actuated machine which develops different back pressures throughout an operating cycle, a shiftable element in said pump for controlling the amount of fluid delivered by the pump, means positioned at one side of the pump and tending continually to shift said element away from the no-delivery position, means positioned at the opposite side of the pump for moving the shiftable element in the opposite direction in accordance with the back pressure developed in said machine, said means comprising a pair of pistons contained within the casing and arranged end to end, a rod abutting the inner surface of the inner piston and secured to said shiftable element, said inner piston being of larger diameter than the outer piston whereby an annular pressure area is presented between the adjacent piston surfaces, a pair of radial passageways extending through the casing and communicating respectively with said annular piston area and the effective area of the outer piston, and passageways running parallel of the casing and extending between the interior of the casing and the respective radial passageways, all of said passageways being adapted to be selectively closed and opened in order to permit fluid back pressure of different amounts to be applied respectively to the effective areas of the pistons, the lateral passageway leading to the effective area of the larger piston and the radial passageway leading to the effective area of the smaller piston being adapted to be simultaneously closed when fluid back pressure is applied to the radial passageway leading to the effective area of the smaller piston.

12. In combination, a variable delivery pump including a casing therefor for supplying pressure fluid to a fluid-actuated machine which develops different back pressures throughout an operating cycle, a shiftable element in said pump for controlling the amount of fluid delivered by the pump, means positioned at one side of the pump and tending continually to shift said element away from the no-delivery position, means positioned at the opposite side of the pump for moving the shiftable element in the opposite direction in accordance with the back pressure developed in said machine, said means comprising a pair of pistons contained within the casing and arranged end to end, a rod abutting the inner surface of the inner piston and secured to said shiftable element, said inner piston being of larger diameter than the outer piston whereby an annular pressure area is presented between the adjacent piston surfaces, a pair of radial passageways extending through the casing and communicating respectively with said annular piston area and the effective area of the outer piston, passageways running parallel of the casing and extending between the interior of the casing and the respective radial passageways, a third piston contained in said casing and having a diameter greater than either of said pair of pistons, said third piston being fixedly mounted on a rod which abuts the outer surface of the smaller piston of said pair of pistons, and a passageway through said casing and communicating with the effective area of said third piston, all of said passageways being adapted to be selectively closed and opened in order to receive fluid back pressure of different amounts.

WALTER ERNST.